though citizens of Ireland, are residents of the United States.

United States Patent [19]
Lynam et al.

[11] Patent Number: 5,066,112
[45] Date of Patent: Nov. 19, 1991

[54] PERIMETER COATED, ELECTRO-OPTIC MIRROR

[75] Inventors: Niall R. Lynam; Richard J. Gahan, both of Holland, Mich.

[73] Assignee: Donnelly Corporation, Holland, Mich.

[21] Appl. No.: 454,398

[22] Filed: Dec. 21, 1989

[51] Int. Cl.⁵ .............................................. G02F 1/01
[52] U.S. Cl. .................................... 359/267; 359/245
[58] Field of Search ........................................ 350/357

[56] References Cited

U.S. PATENT DOCUMENTS

| | | | |
|---|---|---|---|
| 3,806,229 | 4/1974 | Schoot et al. | 350/160 |
| 4,676,001 | 6/1987 | Itoh et al. | 350/331 R |
| 4,761,061 | 8/1988 | Nishiyama et al. | 350/357 |
| 4,773,740 | 9/1988 | Kawakami et al. | 350/357 |
| 4,832,467 | 5/1989 | Miyagi et al. | 350/357 |
| 4,852,979 | 8/1989 | Agrawal | 350/357 |
| 4,878,743 | 11/1989 | Aikawa et al. | 350/357 |
| 4,906,075 | 3/1990 | Matsumiya | 350/357 |
| 4,927,246 | 5/1990 | Ito et al. | 350/357 |
| 4,927,979 | 8/1989 | Agrawal | 350/357 |

FOREIGN PATENT DOCUMENTS 2513198 of 0000 France.

OTHER PUBLICATIONS

European patent application No. 240,226 (87302630.8), filed Mar. 24, 1987, published Oct. 7, 1987, entitled "Single Compartment, Self-Erasing, Solution-Phase Electro-Chromic Devices, Solutions for Use Therein, and Uses Thereof," invented by Harlan Jay Byker, Applicant: Gentex Corporation, Zeeland, Mich.
Electrochromic Automoative Day/Night Mirrors, Niall R. Lynam, Donnelly Corporation, SAE Technical Paper Series, Feb. 23-27, 1987.

Primary Examiner—Rolf Hille
Assistant Examiner—Mahshid Saadat
Attorney, Agent, or Firm—Price, Heneveld, Cooper, DeWitt & Litton

[57] ABSTRACT

An electro-optic mirror of the type having an electro-optic cell or medium with a transmittance which is variable upon the application of an electric field includes a perimeter coating applied to a front or rear surface of a substrate element for concealing any seal and/or electrical connections for the elctro-optic cell or meidum. The perimeter coating may be reflective to increase the field of view in the mirror and allow use of smaller cases or retaining bezels. Alternately, the perimeter coating may be opaque and nonreflective such as black frit, paint or lacquer. In either case, the coating may also be electrically conductive to substantially encircle an electrically conductive layer on the substrate and evenly distribute electric current to the electro-optic cell or medium for enhanced coloration response. The perimeter coating may be used with either a single, optically transparent mirror substrate including solid-state electro-optic cell or a laminate mirror assembly including spaced, optically transparent substrates with an electro-optic medium confined therebetween. Alternately, the laminate assembly includes a seal between said substrate elements which is either dark or color matched to the surrounding rim/bezel providing a border of uniform color around the assembly perimeter.

54 Claims, 7 Drawing Sheets 5,066,112

PERIMETER COATED, ELECTRO-OPTIC MIRROR

BACKGROUND OF THE INVENTION

This invention relates to mirrors for vehicles and other purposes and, more particularly, to electro-optic mirrors incorporating an electro-optic medium or cell which varies the transmittance of light upon the application of an electric field and a perimeter which conceals any seal structure and electrical connections, and/or enhances electrical conductivity for increased coloration performance, and/or provides an appealing border around the mirror.

In the past, vehicular rearview mirror designers have had a wide choice of mirror case bezels for holding interior and exterior rearview mirrors on vehicles. Typically, mirror cases have included an edge bezel or retaining rim which extends around the periphery of the mirror element and over the viewing surface of the mirror, typically to a width of 5 millimeters or so. More recently, however, vehicle designers have desired thinner, less noticeable bezels. One reason for this is the aesthetic or cosmetic appeal of thin bezels since thick bezels are judged, from a styling viewpoint, to be heavy or chunky and to detract from the visual appeal of the mirror design.

Another reason applies to outside or exterior vehicle mirrors where bezel design, and the desire to have the bezel as thin as possible, is particularly important. Minimization of the aerodynamic drag caused by outside mirror case assemblies leads to a desire to utilize as small a mirror reflector element as comfortably meets the need to provide a sufficiently wide field of view to the driver. Such mirrors provide the driver with confidence and comfort in using the outside rearview mirror for critical driving decisions such as lane changes and the like. Also, for outside mirrors, a sufficient reflector area must be available to satisfy the field of view requirements as set forth in the U.S. Federal Motor Vehicle Standard No. 111. For a typical driver-side outside rearview mirror used in the United States, field of view is reduced by about 2% for every 1 millimeter of shrinkage in overall dimensions. Many outside mirrors in current use utilize no bezels and automaker stylists, and thus consumer tastes, have grown accustomed to, and appreciative of, small bezels or no bezels on automotive outside mirrors. Indeed, it has been customary in many outside/exterior rearview mirrors to avoid the use of any bezel by mounting the mirror element directly on a backing plate with adhesives or the like.

More recently, electro-optic mirrors have required larger, thicker bezels because of the very nature of the mirror assembly. Such mirrors typically include a pair of glass substrates spaced from one another and retained together by epoxy seals forming a cavity therebetween which retains liquid crystal, electrochromic or electrochemichromic media which darkens or dims when electricity is applied across the media. In such constructions, bus bars extend beyond the seal structure from edges of the glass substrates to provide attachment points for electrical leads. In order to effectively hide these seal and bus bar regions in a conventional electro-optic mirror, the bezel or retaining rim at the perimeter of the mirror assembly was required to be significantly wider than for conventional rearview mirrors, i.e., a width of 6 to 7 millimeters or so. Consequently, the desire for small bezels could not be met in these mirror assemblies.

Because of their expense, electro-optic rearview mirrors, especially for the outside of a vehicle, may not be installed on all vehicles and, in many cases, are considered an optional item. Even when installed, such mirrors may be placed only on the driver's side. However, in their desire for symmetry on a vehicle, vehicle designers feel restricted by the size of the required bezels necessary to hide the electro-optic seal and electrical structure of such mirrors. This is because a large bezel, even on a conventional exterior mirror, would be necessary to provide symmetry on a vehicle including only a single electro-optic exterior mirror, i.e., a similar appearance on both sides of the vehicle.

Therefore, a need has arisen in the automotive industry for rearview mirrors, and especially electro-optic rearview mirrors, which avoid the necessity of large retaining bezels or rims as are currently required on conventional electro-optic mirrors. Concurrently, the advantages of enhanced coloration performance, reduced aerodynamic drag, increased field of view in the mirror for a given small bezel size, and improved aesthetic appeal have also been desired. The present invention was conceived in recognition of and as a solution for these needs.

SUMMARY OF THE INVENTION

Accordingly, the present invention provides an electro-optic mirror or mirror assembly of the type having an electro-optic cell or medium with a light transmittance which is variable upon the application of an electric field. The mirror or mirror assembly includes a perimeter coating applied to either a front or rear facing surface of a substrate element for concealing any seal and/or electrical connections for the electro-optic cell or medium. Alternately, the electro-optic seal itself may be of a dark color or have a color matched to the surrounding bezel or rim to form an aesthetically pleasing, less obtrusive perimeter border around the mirror. The perimeter coating may be reflective or opaque and, in either case, may also be electrically conductive to substantially encircle an electrically conductive layer on the substrate element and evenly distribute electric current to the electrically conductive layer and, hence, to the electro-optic cell or medium for enhanced coloration response. The perimeter coating may be used with either a single, optically transparent mirror substrate including a solid-state electro-optic cell, or with a mirror assembly having a laminate cell including spaced, optically transparent elements having an electro-optic medium confined therebetween.

In one form, the invention is an electro-optic mirror assembly including at least first and second spaced, optically transparent elements, the elements each having a peripheral edge and front and rear facing surfaces and defining a space therebetween. An electro-optic medium is confined within the space and has a light transmittance which is variable upon the application of an electric field thereto. A seal extends around the entire periphery of the assembly between the first and second elements adjacent the peripheral edges for spacing the elements apart and confining the electro-optic medium in the space. Electrical means for applying an electric field to the electro-optic medium to cause variation in the light transmittance of the medium are also included. A reflective coating on one of said front and rear facing surfaces of the second element is adapted to reflect light incident thereon through the first element and the electro-optic medium. A perimeter coating on at least one of a portion of the electrical means and one of the front and rear facing surfaces of the first element adjacent the peripheral edge of the first element conceals the seal and portions of the electrical means therebehind when the assembly is viewed from the first element toward the second element.

The perimeter coating may be reflective such that it appears substantially similar to the reflective coating in the assembly when viewed from the front. Preferably, such reflective perimeter coating is metallic and is selected from the group including silver, aluminum, chromium, stainless steel, rhodium, platinum, palladium and/or combinations thereof. Alternately, the perimeter coating may be opaque to light incident on the assembly such as a black frit or paint applied to the assembly. In either case, the perimeter coating may be electrically conductive and extend around substantially the entire first element adjacent the peripheral edge such that it contacts at least a portion of the electrical means on the first element and provides enhanced coloration response for the mirror.

Preferably, the electrical means include a transparent, electrically conductive layer on the rear surface of the first element and a similar layer on the front surface of the second element. The perimeter coating is preferably applied either on top or beneath the conductive coating layer on the first element. A layer of electrically conducting material may be applied to the perimeter of the second element in contact with the electrically conductive layer thereon as well as to the electrically conductive layer on the first element if the perimeter coating is not itself electrically conductive. Electrical leads may then be connected to such conducting material by soldering, adhesive or other methods. Such electrical conducting material preferably wraps around the corners of the first and second elements onto the peripheral edge for more convenient attachment.

In another aspect of the invention, the seal in the laminated assembly may be formed in a dark color or a color which matches the mirror case, housing or bezel such that the seal is less conspicuous when the assembly is viewed from the front. Such darkening or color matching of the seal in said laminate assembly is particularly advantageous in mirror devices. This is because not only can portions of the seal be viewed from the front or obliquely from the front, the seal can also be viewed in reflection in the mirror reflector inherent to said mirror devices. Thus, the cosmetic disadvantage of nondarkened or color mismatched seals is amplified and exemplified in mirror devices and leads to use of even larger bezel or retaining rim dimensions. Preferably, the seal means may be a layer of epoxy material including carbon black to impart a black color, and may incorporate a plurality of small glass beads mixed therein to space the elements apart.

Alternately, the invention may include a dark colored seal or a seal matched to the surrounding rim or bezel without any perimeter coating or with a very narrow perimeter coating hidden by the rim or bezel. In such case, the seal provides an aesthetically appealing, less obtrusive border for the overall assembly.

Further, the second element may be made smaller than the first element such that its peripheral edge is positioned behind the perimeter coating for effective concealment of electrical connections and the seal. Alternately, the second element may be offset relative to the first element such as is common in liquid crystal display assemblies. Alternately, the first and second elements may be notched at spaced positions to provide connection sites to the electrical means on the opposing elements.

In yet another aspect of the invention, the perimeter coating may be formed in two portions, one being an electrically conductive portion which contacts at least a portion of the electrical means on the first element, while the second is not electrically conductive but is opaque and serves to hide and conceal most or substantially all of the seal means and electrical connection regions.

In another form, the invention is an electro-optic mirror including an optically transparent substrate element having front and rear surfaces, an electro-optic medium on the rear surface which has an optically variable transmittance upon the application of an electric field, and electrical means for applying an electric field to the electro-optic medium to cause variation in the light transmittance of the medium. A reflective coating is also included on the electro-optic medium to reflect light incident thereon through the element and the electro-optic medium. A perimeter coating is provided on at least one of the electrical means or a surface of the element and adjacent the periphery of the element for concealing perimeter edge portions of the assembly including portions of the electrical means therebehind when the assembly is viewed from the front of the element.

In preferred forms of this single optical element version of the invention, the perimeter coating may be on the front or rear of the element, may be reflective or opaque, and may also be electrically conductive. Also it is preferred that the electro-optic medium be solid-state and include a first electrochromic material in abutting relationship with an electrically conductive layer on the substrate element, the first electrochromic material being either an anodic electrochromic layer or a cathodic electrochromic layer. A solid electrolyte layer is positioned in abutting relationship to the first electrochromic material followed by a second electrochromic material in abutting relationship with the electrolyte layer. The second electrochromic material is the other of the anodic or cathodic electrochromic layer. Finally, the reflective coating is a layer of reflective and conductive material in abutting relationship with the second electrochromic material. The solid-state electro-optic cell may be coated with a shatterproofing coating followed by a hermetically sealing coating to protect the mirror from environmental and mechanical damage.

As will be understood, the invention provides the advantages of concealment of or aesthetic blending of any seal structure or electrical connections for the electro-optic cell or medium thereby allowing the use of small, less conspicuous and less noticeable bezels or rims for holding the mirror, or on a backing plate without any bezel at all. With a perimeter coating which is reflective, the effective field of view of the mirror is increased while the seal and electrical connection areas are concealed. Alternately, the perimeter coating may be opaque and nonreflective such as a black frit so that the appearance of the mirror assembly can be matched to and made symmetrical with a nonelectro-optic mirror on the opposite side of the vehicle. Further, the perimeter coating may be electrically conductive and effectively encircle the electrically conductive layers in the mirror to evenly distribute electric current to the electro-optic cell or medium and thereby enhance and make more uniform the coloration response of the mirror. Finally, the invention is applicable to either single substrate element mirrors using solid-state electro-optic cells or laminate mirror assemblies including spaced substrate elements having an electro-optic medium confined therebetween.

These and other objects, advantages, purposes and features of the invention will become more apparent from a study of the following description taken in conjunction with the drawings.

DESCRIPTION OF THE PREFERRED EMBODIMENTS

Figure 1:
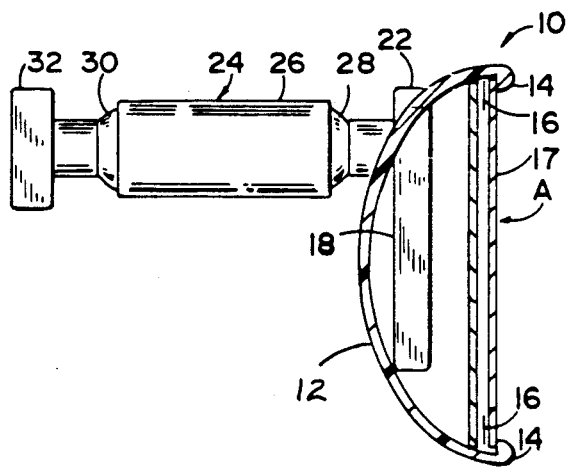
FIG. 1 is a schematic side elevation shown partially in section showing an interior rearview mirror assembly of the present invention having an electro-optic mirror assembly with a perimeter coating.
Figure 2:
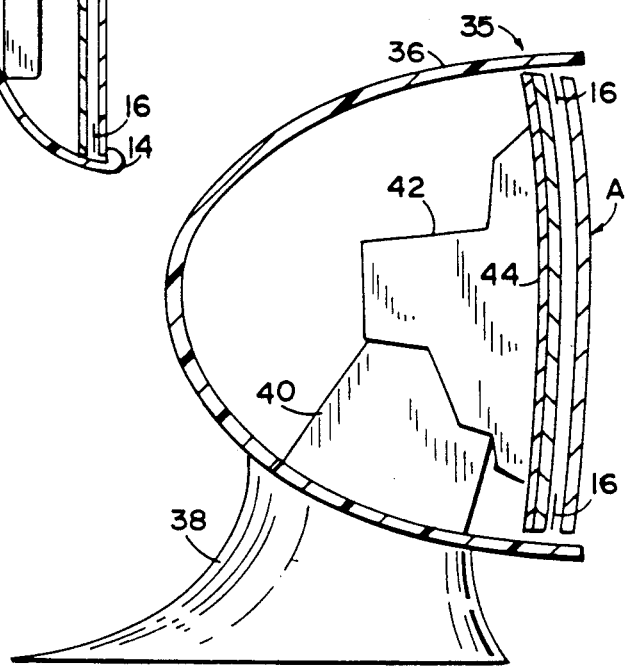
FIG. 2 is a schematic side elevation shown partially in section of an exterior/outside rearview mirror of the present invention having an electro-optic mirror assembly with a perimeter coating.

Referring now to the drawings in greater detail, FIGS. 1 and 2 schematically illustrate the perimeter coated, electro-optic mirror of the present invention applied to both an interior vehicular rearview mirror (FIG. 1) as well as an exterior vehicular rearview mirror (FIG. 2). The interior rearview mirror 10 of FIG. 1 includes a molded plastic housing or case 12, typically injection molded from a resinous plastic material such as polypropylene, nylon or the like, including a retaining rim or bezel 14 which surrounds and encircles the electro-optic mirror assembly A retained within case 12. Case 12 will typically include a mounting support 18, supported by an arm 24 which typically includes a pair of universally pivotable ball joints 28, 30 enclosed within a mounting tube 26. The mounting/support arm 24 is adapted for attachment to a windshield mounted support button or the header of the vehicle roof adjacent the windshield by means of a mounting element 32. As will be explained below, the electro-optic mirror assembly A includes a specularly reflective or opaque perimeter coating 16 which is preferably applied to the front or rear surface of the front glass substrate element or panel 17 in order to hide and conceal the seal and electrically conductive structure therebehind, portions of electrical connections to the mirror assembly, as well as to increase the field of view over prior known electro-optic mirror assemblies. As explained below, the electro-optic mirror assembly A incorporating the perimeter coating 16 allows the use of smaller retaining rims or bezels 14 on the mirror case 12 than has previously been known for such assemblies.

Similarly, FIG. 2 illustrates an application of the electro-optic mirror assembly A of the present invention incorporating a perimeter coating 16 to an exterior rearview mirror 35. Exterior rearview mirror 35 is of the type including an aerodynamically shaped, rigid housing 36 which is closed in one direction and opens in the other direction. Housing 36 is supported on base 38 which is typically secured to a window assembly, fender or door of a vehicle for viewing by the driver or front seat passenger in a vehicle. Within case 36, a support 40 mounts an electric drive assembly 42 to which is secured a backing plate 44 on which electro-optic mirror assembly A is attached such as by a suitable adhesive. In this embodiment, electro-optic mirror assembly A, although surrounded by the edge of housing 36, is not retained directly by any surrounding rim or bezel because it is supported by backing plate 44. Therefore, perimeter coating 16, when specularly reflective, allows a significant increase in the field of view for a mirror assembly such as 35, while substantially hiding and concealing the seal structure and/or electrical connections for the mirror assembly when there is no surrounding rim or bezel.

As will be explained below, various embodiments of the electro-optic mirror assembly A incorporating the present invention may be substituted in assemblies such as those shown in FIGS. 1 and 2 within the concept of this invention.

Figure 3:
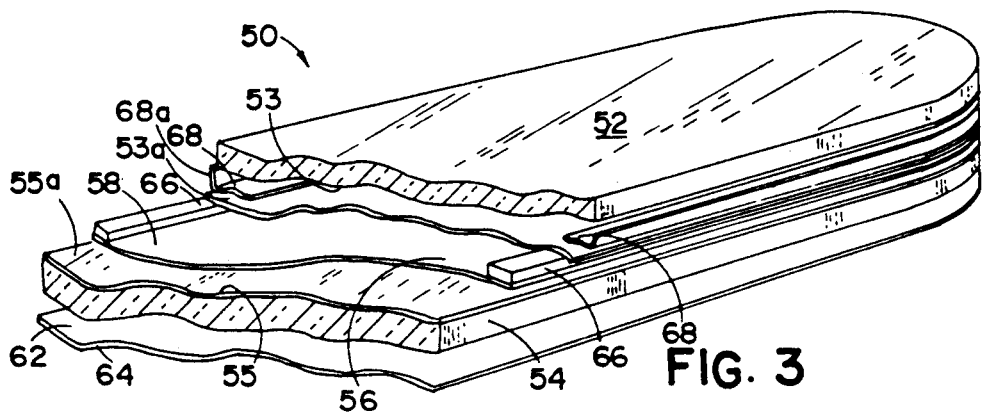
FIG. 3 is a fragmentary, perspective view of a first embodiment of the present invention incorporating a laminate electro-optic mirror assembly.

Referring now to FIGS. 3 and/or 4, a first embodiment 50 of an electro-optic mirror assembly incorporating the present invention is shown. Electro-optic mirror assembly 50 is a laminate construction including a front glass substrate element or panel 52 which may be scatter and anti-lacerative protected and ultraviolet radiation stabilized as described in co-pending U.S. patent application Ser. No. 07/155,256, filed Feb. 12, 1988, entitled "ANTI-SCATTER, ULTRAVIOLET PROTECTED, ANTI-MISTING ELECTRO-OPTIC REARVIEW MIRROR," invented by Niall R. Lynam, now abandone the disclosure of which is hereby incorporated by reference herein. Although the front element may itself be a laminated element as in FIG. 19, element 52 in this embodiment is preferably formed from an elongated, generally planar sheet of conventional soda lime window glass with rounded ends as is the second glass substrate element 54. Second element 54 is preferably identical in size to and spaced slightly rearwardly from front element 52 to define a gap or space 56 for receiving an electro-optic medium 58 as explained below. Alternately, specialized glass may be used for elements 52, 54 as described in U.S. Ser. No. 07/155,256. Elements 52, 54 may also be optically transparent, resinous, polymeric sheets to further prevent fragment scattering and lacerative injuries if broken as well as to reduce weight. Space 56 is formed between the generally parallel rear facing surface 53 of the front or first glass element 52 and the forward facing surface 55 of rear or second glass substrate element 54. Preferably, each of the front and rear facing surfaces 53, 55 include a layer or coating 53a, 55a of transparent, electrically conductive material such as indium tin oxide (ITO) which enables application of an electric field or voltage across space 56 between ITO layers 53a, 55a. Other possible transparent, electrically conductive coatings include doped tin oxide or doped zinc oxide. Preferably, the ITO is a one-half wave coating having a sheet resistance of about 15 ohms/square. Gap 56 is preferably 150 microns wide.

The rear surface 60 of rear glass element 54 is coated with a reflective layer 62 preferably of metallic material such as aluminum, or a combination of silver and copper as is conventionally known. Other materials which may be used for the reflective layer include chromium, stainless steel, rhodium, platinum, palladium and/or combinations thereof. Such layer provides a highly specular surface which reflects approximately 40 to 95% of the incident light thereon through front and rear glass elements 52, 54 and electro-optic medium 58 in space 56. In order to prevent scattering of glass fragments from the rear glass element 54 in the event of breakage or damage during a collision in the vehicle, a layer 64 of tape or a plastisol-type plastic adhesive, typically about 0.1 millimeter thick, is applied to the rear surface of reflective coating 62. This anti-scattering layer may be opaque, translucent or transparent since it is behind reflective coating 62 and need not transmit or reflect any light.

Figure 4:
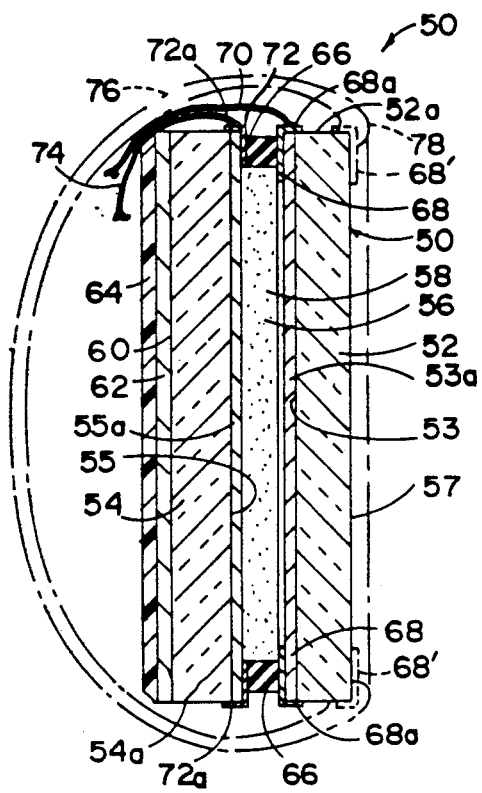
FIG. 4 is a sectional side elevation of the mirror assembly of FIG. 3.

In order to confine and retain the electro-optic medium 58 in gap 56, a peripheral seal 66, formed from an epoxy material which adheres well to the ITO coatings 53a, 55a on glass surfaces 53, 55, is applied adjacent the peripheral edges of the glass elements 52, 54. A suitable epoxy sealing material is EPON 828 ™ from Shell Chemical Company of Houston, Tex. cured by polyamide based curing agents such as V-40 ™ from Miller Stephenson Company of Danbury, Conn. Prior to application of the epoxy sealing material 66, however, the rear facing surface 53 of ITO coated front glass element 52 is coated with a perimeter coating layer 68 of reflective metallic material such as aluminum, silver/copper, or one of the other materials mentioned above and also used for reflective layer 62. Such metallic reflective layer, because of the method of application, typically extends around the rear perimeter corner of glass element 52 and extends along the peripheral edge 52a of element 52 partially toward the front surface 57 such that it covers the peripheral edge of ITO coating 53a as shown at 68a. Reflective perimeter coating 68 preferably extends inwardly toward the center of ITO coating 53a a distance of 5 to 8 millimeters which is sufficient to cover and extend beyond the entirety of the epoxy seal 66 as shown in FIG. 4, which seal is typically approximately 5 to 7 millimeters in width.

Perimeter reflective coating 68 is preferably applied to the rear surface of ITO coated glass element 52 by masking the central portion of the rear surface of the ITO coated glass except for a perimeter band extending around substantially the entire perimeter of the rear facing surface of such ITO coated glass element following which the reflective coating 68 is applied by a vacuum deposition process such as sputtering or evaporation in a conventionally known manner. Such vacuum deposition causes the reflective coating to extend around the corner of the glass element onto the peripheral edge 52a as shown at 68a through the natural application process. The peripheral portion 68a thereby provides a convenient attachment point for one of the wire leads or electrical connections by which an electric field is applied across gap 56 and electro-optic medium 58. Wire lead 70 is preferably applied by soldering with electrically conductive solder to peripheral portion 68a or by an electrically conductive adhesive or the like.

Similarly, an electrical connection is made to the ITO coated, front facing surface of rear glass element 54 by masking the central area of the ITO coated rear glass element and silk screening a thin coating layer of electrically conductive material 72 around substantially the entire perimeter of the rear surface of the ITO coated element such that the conductive material extends around the corner of the element and partially along the peripheral edge as shown at 72a. Conductive layer 72 preferably extends inwardly toward the center of element 54 a distance less than the width of seal 66, i.e., within the range of about 1 to 4 millimeters. Preferably, conductive layer 72 is formed from a conductive paint or frit such as du Pont 7713 available from E. I. du Pont de Nemours and Company of Wilmington, Del. After silk screening onto ITO coating 55a, layer 72 is preferably fired at a temperature greater than 400° C. in a reducing atmosphere to avoid oxidizing the ITO. du Pont 7713 fires to a hardened, fused layer. Alternately, conductive layer 72 may be formed of Eccocoat CC-40A from Emerson and Cumming Inc. of Woburn, Mass. As with perimeter reflective coating 68, a wire lead 74 may be connected by soldering, electrically conductive adhesive or the like to perimeter edge portion 72a of layer 72 so that electricity may be applied to rear ITO coating 55a thereby completing the electric field across gap 56 and electro-optic medium 58 to cause proper coloration response for that medium. Since the conductive reflective coating 68 and the conductive coating 72 extend substantially entirely around and encircle their respective ITO coatings adjacent the perimeter edges, a highly conductive track is provided which distributes current evenly around the full perimeter of these ITO coated front and rear glass elements. Because of such even electrical distribution, electric current flows quickly into the central regions of the ITO coated surfaces and, thus, into the entirety of the electro-optic medium 58 to provide faster, more uniform coloration response from the electro-optic medium. In this regard, the specific conductivity of metal reflective layer 68 is some 10 to 50 times larger than that of the transparent conductive coating such as ITO indicating the greater ability for coloration response.

Alternately, perimeter coating 68 and/or conductive layer 72 may be screened directly on the respective front and rear element surfaces 53, 55 prior to application of ITO or other transparent, electrically conductive ITO or other coatings 53a, 55a. In such case the coatings 53a, 55a overlap and contact coating 68 and layer 72. Prior to application of ITO coatings 53a, 55a, layer 72 can be fired less expensively to fuse and harden without the need for a reducing atmosphere.

After application of the reflective conductive coating 68 and conductive layer 72 as described above, epoxy seal 66 is preferably silk screened onto the inner surface of the front glass element 52 or the rear glass element 54 or onto both glass elements. The corresponding elements are then placed face to face with the epoxy still being in tacky condition. The epoxy sealant 66 is then fully cured, typically by placing the assembly into an oven at approximately 110° C. for approximately three hours. Such sealant material 66, which is electrically insulating, cross-links, hardens and becomes highly stable and retentive for the electro-optic medium 58 through such curing. Gap 56 may then be filled by a variety of means such as simple injection of electro-optically active material using a syringe, or by vacuum backfilling as described in co-pending, commonly assigned U.S. patent application Ser. No. 07/443,113, filed Nov. 29, 1989, entitled "HIGH PERFORMANCE ELECTROCHEMICHROMIC SOLUTIONS AND DEVICES THEREOF" invented by Desaraju V. Varaprasad, Niall R. Lynam, Hamid R. Habibi, and Padma (NMI) Desaraju, the disclosure of which is hereby incorporated by reference herein.

Typically, glass elements 52, 54 will each be approximately 2 millimeters in thickness while ITO coatings 53a, 55a will have a typical thickness of about 1500 angstroms. Reflective coating 62 may have a thickness within the range of between about 0.01 to 1 microns and preferably will reflect more than 40 to 95% of the light incident thereon, typically in the range of 60 to 95%. Also, various types of electro-optic media may be inserted in gap 56.

For example, a suitable liquid crystal material in which molecules are oriented to block the passage of light therethrough when an electric field is applied is a guest host dye such as D-5 TM produced by VDH Company of Dorset, England, dissolved in n-type nematic liquid crystals such as n-(p-methoxybenzilidene)-p'-butylaniline For such material, cell gap 56 is typically 8 to 12 microns.

For electrochemichromic mirrors, the gap may contain a liquid, thickened liquid, gel, or semi-solid material such as the formulations described in Schoot U.S. Pat. No. 3,806,229, or as described in co-pending, commonly assigned U.S patent application Ser. No. 07/443,113, referenced above, the disclosures of which are hereby incorporated by reference herein.

In electrochromic mirrors, a material such as Poly-Amps TM available from Lubrizol Corp. of Wickliffe, Ohio may be used. Also, a liquid, thickened liquid, gel, or semi-solid material may be used as is conventionally known.

Cell gap or space 56 is typically 50 to 250 microns in these electrochromic or electrochemichromic devices. With the latter materials, application of an electric field will cause media 58 to color to successively darker colors or shades as larger voltages are applied. When voltage is turned off or reversed, the coloring is bleached allowing full transmittance of light and, hence, a full reflectivity from reflective layer 62.

Uniformity of the spacing of the front and rear ITO coated glass elements 52, 54 may be enhanced by the inclusion of small, rigid, glass beads mixed into the epoxy sealant 66 prior to application to the surfaces of the glass elements. Suitable glass beads for inclusion in the epoxy sealant are available under the trademark GS/150 from Nippon Electric Glass of Des Plaines, Ill. Such glass beads may typically be of 150 microns diameter and so space the glass elements to a spacing of 150 microns.

Mirror assembly 50 is preferably incorporated in a molded thermoplastic or other mirror case 76 of conventional form including a peripheral rim or bezel 78 which extends over the front surface 57 a small distance such as 2 to 3 millimeters as shown in FIG. 4. The overall case/mirror assembly is then supported within a vehicle as described above in connection with FIG. 1.

As will now be understood, the reflective metallic perimeter coating 68 extends inwardly of the mirror assembly a distance greater than both the seal structure 66, electrical layer 72, or peripheral rim or bezel 78 of surrounding case 76. Such perimeter coating 68 is thus effective to block, hide and conceal view of the seal and electrical connection structure and, when viewed in daytime conditions, appears to reflect light substantially similarly to the reflective layer 62 on the rear surface of rear glass element 54. Preferably, since reflective layer 62 is on the rear facing surface of the rear glass element, reflective layer 68 is positioned as close as possible to the rear surface of rear element 54, i.e., on the rear facing surface of ITO coated front glass element 52. Such close spacing minimizes any discontinuity in reflected image as much as possible.

Alternately, a reflective perimeter coating 68' could be applied to the front surface 57 of front glass element 52 as shown by the dotted lines in FIG. 4. In such case, an additional electrically conductive material layer in the same position as reflective layer 68 would also be required in order to properly attach and conduct electricity from lead 70 to ITO coating 53a. In either case, perimeter coating 68 or 68' will effectively hide, conceal and prevent view of the seal structure 66, electrical connection 72 and effectively increase the field of view out to the edge of the smaller, thinner, less obtrusive rim or bezel 78 than on conventionally known electro-optic mirror assemblies. At night, while the perimeter reflective coating 68, 68' remains reflective, any brightness or reflected light in the encircling perimeter area should not be distracting to the driver or viewer since the central area of the assembly will be darkened due to the actuation of the electro-optic medium 58 and the consequent attenuation in reflected light from reflective layer 62 in the center of the assembly where the great majority of reflected light such as headlights from following vehicles would normally be seen.

Figure 4A:
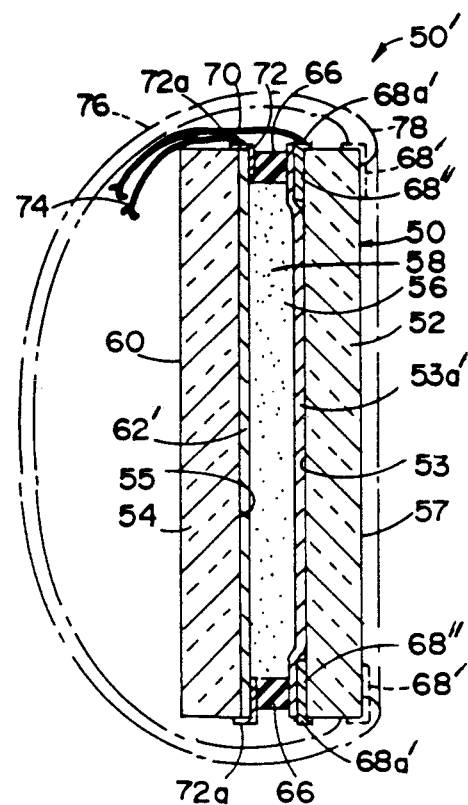
FIG. 4A is a sectional side elevation of a modified form of the mirror of FIGS. 3 and 4.

A modification 50' of the laminate electro-optic mirror assembly described above is shown in FIG. 4A. Embodiment 50' illustrates alternative positions for the reflective coating 62' and the perimeter coating 68". In this embodiment, where like numerals indicate like parts, the assembly remains substantially the same as that shown in FIGS. 3 and 4 except that perimeter coating 68" is first applied to the rear facing surface 53 of front element 52 adjacent the peripheral edge thereof around substantially the entire perimeter of the element such that it extends over the corner of the perimeter along the peripheral edge as shown at 68a' where the electrical connection to lead 70 may be made. As in embodiment 50, perimeter coating 68" may be formed from a reflective metallic material such as aluminum, silver/copper, or one of the other materials mentioned above. The electrically conductive coating layer 53a' is then applied to the entire rear facing surface 53 such that it extends over and overlaps the exposed surface of perimeter coating 68" as shown in FIG. 4A.

On the rear element 54 of embodiment 50', the reflective layer 62 at the rear facing surface of element 54 is eliminated in favor of a similar reflective layer 62' applied along the forward facing surface 55 of the rear element 54. Since reflective layer 62' is formed from a reflective metallic material such as aluminum, silver/copper or another of the materials mentioned above, it is itself electrically conductive. Optionally, electrically conductive material layer 72 may be applied at the perimeter of such reflective coating 62' merely to provide a convenient attachment for a wire lead. Alternately, front element 52 may be notched as described in FIGS. 16 and 17 below to allow direct attachment of a wire lead, clip, ribbon connector or by solder directly to reflective, conductive layer 62' of FIG. 4A. The electro-optic media 58 in space 56 is, thus, in contact with reflective layer 62' and the electric field is applied across the electro-optic media between ITO conductive layer 53a' and reflective layer 62'. The electro-optic media is confined within gap 56 by seal 66 which extends between the reflective layer 62' and conductive material layer 72 and that portion of the ITO conductive coating 53a' which overlaps perimeter coating 68". Of course, the other alternatives mentioned above in connection with embodiment 50 could also be used with embodiment 50'.

Figure 5:
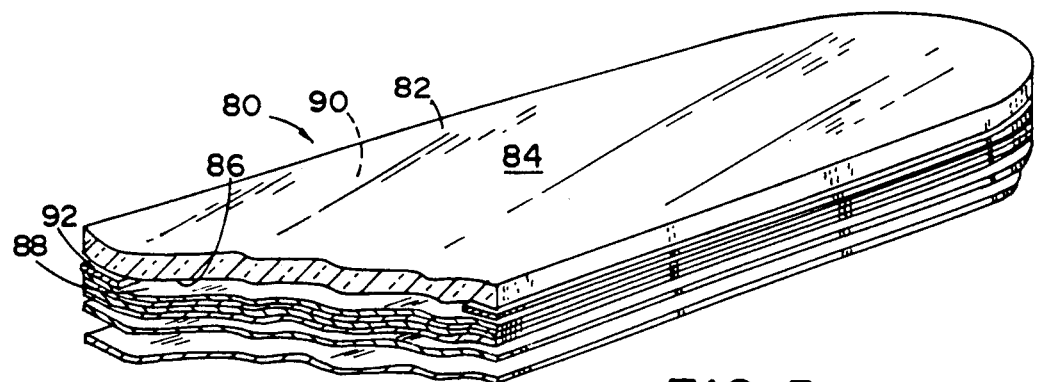
FIG. 5 is a fragmentary, perspective view of a third modified form of the present invention incorporating a single substrate, solid-state, electro-optic cell.
Figure 6:
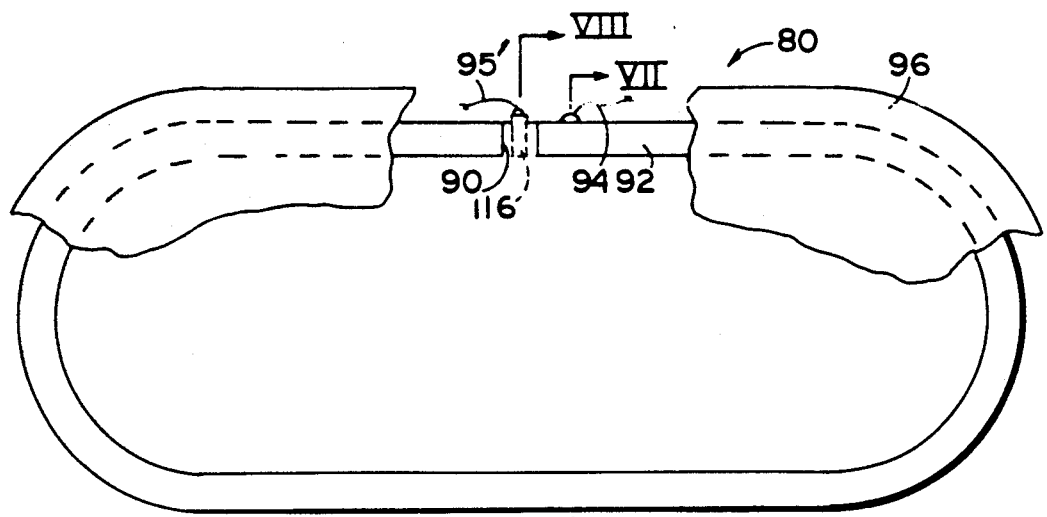
FIG. 6 is a rear elevation of the third modified form of the present invention shown in FIG. 5 with portions broken away and illustrating electrical connections to the mirror.
Figure 7:
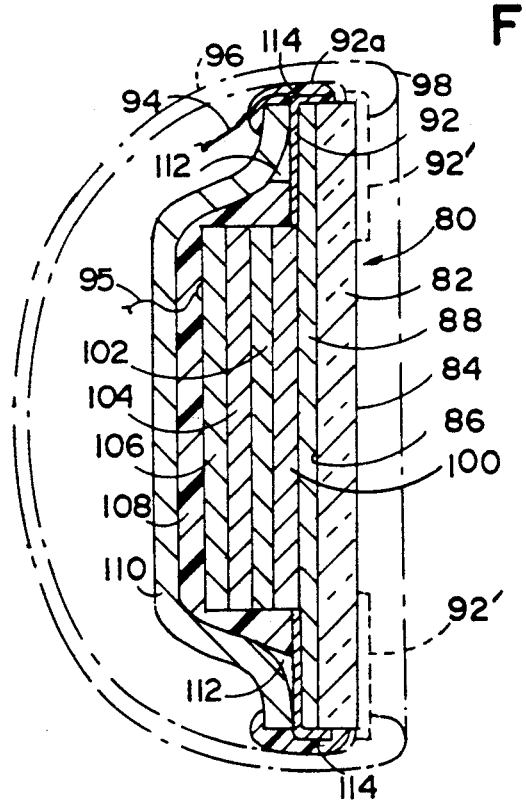
FIG. 7 is a sectional side elevation of the mirror of the present invention taken along plane VII—VII of FIG. 6.

As shown in FIGS. 5-9, a further embodiment 80 of the electro-optic mirror is illustrated comprising a solid-state electrochromic mirror assembly. As is best seen in FIGS. 5 and 7, mirror assembly 80 includes an elongated glass substrate element 82 having rounded ends, a thickness of approximately 2 millimeters, and is formed from conventional soda lime or other glass or resinous plastic. Element 82 includes a front facing surface 84 and a rear facing surface 86, the rear surface having a transparent, electrically conductive coating such as indium tin oxide (ITO) formed in a layer 88 thereon. As with the elements 52, 54 in assembly 50, ITO coated element 82 may be masked on its rear surface in the central region and in one small area of the perimeter border as shown at 90 in FIGS. 6 and 8. The ITO coating 88 in this small border region 90 is removed using conventional means such as sandblasting, acid etching, scribing and the like. Thereafter, a perimeter coating 92 of metallic reflective material such as aluminum, silver/copper or the like as described above is vacuum deposited by sputtering or evaporation adjacent the perimeter edge such that it extends around the corner of the element 82 and along the peripheral edge thereof toward the front surface 84 as shown at 92a. Since the metallic reflective coating 92 is electrically conductive, portion 92a provides a convenient location for attachment of one of the electrical leads 94 (FIGS. 6 and 7) for applying an electric field to the electro-optic mirror by means of soldering with electrically conductive solder, attachment with electrically conductive adhesive, or the like.

Figure 10:
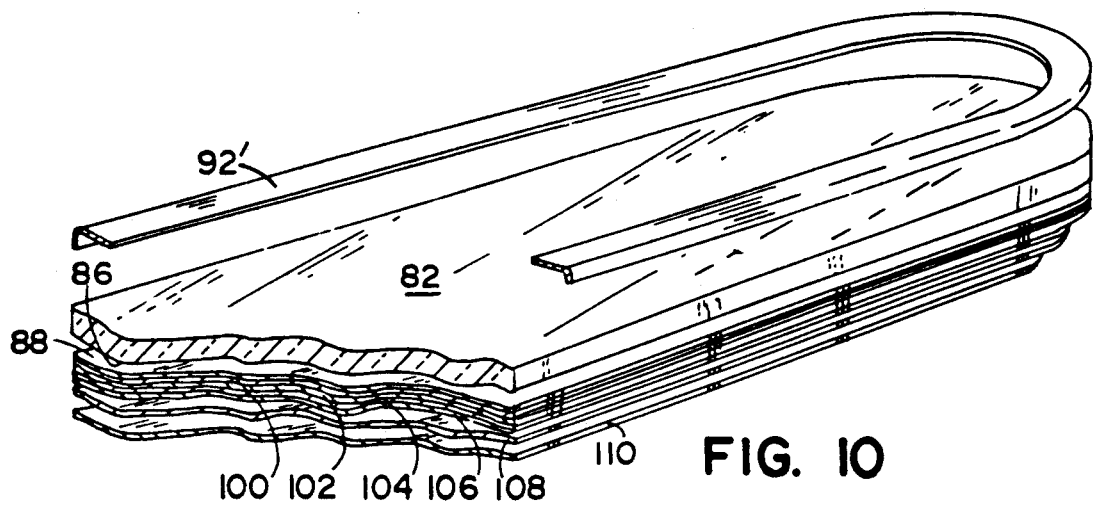
FIG. 10 is a fragmentary, perspective view of a second modified form of the mirror of FIGS. 5-8 also incorporating a solid-state electro-optic cell.

Alternately, the metallic reflective coating 92' may be applied to the front surface 84 of element 82 adjacent the perimeter and extending continuously around the entire periphery of the front facing surface of element 82 adjacent the peripheral edge as shown in FIG. 10 (see also the dotted lines in FIG. 7). As in the case of reflective coating 92, vacuum deposition naturally allows the layer to extend around the corner of element 82 onto the peripheral edge. In either case, coating 92 or 92' provides an effective concealment for the structure of the electrochromic mirror therebehind and, when reflective, effectively increases the reflective field of view of the entire mirror by allowing rim/bezel 98 of mirror case 96 to be thinner, smaller and less obtrusive as in mirror assemblies 50, 50' of FIGS. 3, 4 and 4A. Indeed, as before, no rim/bezel need be used to hide the edge connection/seal regions of this mirror.

Instead of a second substrate element or panel spaced from the rear surface of coated substrate 82 to provide a confining area for an electro-optic medium as in mirror assemblies 50, 50', mirror assembly 80 includes a solid-state stack of electrochromic layers which perform a similar function of darkening or changing color upon the application of an electric field, substantially in proportion to the amount of the electrical voltage applied, so as to attenuate light reflected from a rear reflective layer. The stack of electrochromic layers is substantially similar to that shown and described in U.S. Pat. No. 4,852,979, issued Aug. 1, 1989, entitled "ENCAPSULATED ELECTROCHROMIC MIRROR AND METHOD OF MAKING SAME," invented by Anoop Agrawal, and assigned to the same assignee as the present invention, the disclosure of which is hereby incorporated by reference herein.

The mirror stack includes film layers formed by sequentially depositing each of the thin solid films by any of several different techniques, including vacuum deposition, sputtering, evaporation, solution dipping, spinning, spraying and the like. The mirror stack is preferably formed overtop ITO coating 88 which generally has a thickness of between about 300 and 3000 angstroms and a preferred thickness of 1500 angstroms.

Deposited onto layer 88, except for the perimeter area occupied by reflective metallic perimeter coating 92 which is protected by appropriate masking, is a first electrochromic layer 100. Electrochromic layer 100 is preferably an anodic electrochromic material which will color when positively charged and preferably comprises nickel hydroxide. Other suitable anodic electrochromic materials include iridium oxide, rhodium oxide and cobalt oxide. The electrochromic layer is usually from 100 to 1000 angstroms in thickness with thicknesses of 300 to 600, especially 400, angstroms being preferred.

The next layer is a solid electrolyte or ion donor layer 102. Since electrolyte layer 102 serves to isolate anodic electrochromic layer 100, layer 102 must be ion conducting, electron insulating, clear and must remain clear during bleaching of the electrochromic layers. Suitable materials include tantalum pentoxide, cerium oxide, aluminum oxide, magnesium fluoride, silicon dioxide and mixtures thereof, with tantalum pentoxide being currently preferred. The electrolyte layer typically has a thickness in the range from 750 to 2000, preferably 1000 to 1500, most preferably 1300, angstroms.

Electrochromic layer 104 is a cathodic electrochromic material, preferably tungsten oxide. Other useful cathodic electrochromic materials include molybdenum oxide, tungsten oxide-molybdenum oxide mixtures, niobium pentoxide, titanium pentoxide and vanadium pentoxide. Cathodic electrochromic materials color when negatively charged. When the mirror stack is subjected to an appropriate potential difference, both anodic and cathodic electrochromic layers will color. The electrochromic layers have a memory and, hence, retain their colored condition even after the potential is removed. When the potential is reversed, both layers will clear or bleach and retain that condition even after the charge is removed. The thickness of the cathodic electrochromic layer is in the range of from 500 to 6000, preferably 600 to 1200, and most preferably 800, angstroms.

Thereafter, conductive, reflective coating layer 106 is applied preferably from aluminum. Other suitable materials include palladium, chromium and similar metal reflective layers. Layer 106 serves a dual purpose, namely, reflecting incident light and conducting electricity to the cathodic electrochromic layer 104. The thickness of the reflective layer 106 is in the range of from 250 to 2000, preferably 1000 to 1500, and most preferably 1000, angstroms.

The mirror layers 100-106 are preferably protected from environmental and mechanical damage by covering these solid-state thin films over their entire exposed surface with a shatterproofing backing 108, which backing extends to and is affixed to perimeter coating 92 at the side of substrate 82 upon which ITO coating 88 and the thin films are applied or deposited. Reference to affixing or adhering the shatterproofing backing 108 to substrate 82 is intended to include affixing the conductive coating 88 on the back side thereon as shown in the drawing. The shatterproof backing is typically a soft polymeric layer characterized by hydrophobicity, low modulus, fair adhesion to the exposed surface of substrate 82, coating 88 or coating 92 thereon, is processible at temperatures below 60° C., maintains its properties at least in the temperature range of $-50°$ to $+100°$ C., does not release volatiles during processing, has almost zero shrinkage and no ionic impurities. Generally, shatterproof backing 108 will be deficient in hermetic characteristics because of the high diffusion coefficient of gases and vapors through polymers in their soft or rubbery state. Suitable materials for forming the shatterproofing layer include natural and synthetic rubber latexes, polyurethanes, cellulose acetate butyrate and curable silicone rubbers. Room temperature curing silicone rubbers are currently preferred.

Hermetic backing 110 is then applied over the entire exposed surface of shatterproof backing 108 and onto the outer periphery of substrate 82 to hermetically seal backing 108 and the solid-state films 100-106 from the ambient environment, thereby minimizing the transport of water to or from the electrochromic layers. Suitable materials for forming the hermetic backing include metallic foil, films of glassy or crystalline hydrophobic polymers and combinations. Especially preferred polymeric films are polyolefins, polyester and polyvinylidene chloride. Aluminum foil is the currently preferred backing, although in some applications, another glass plate or a ceramic member may be used as the hermetic backing 110 to impart more rigidity to the mirror assembly or to mount other components such as circuits.

In addition, a primary hermetic adhesive 112 is utilized to bond hermetic backing 110 to coated substrate 82, 88, 92. The thickness of the adhesive glue line should be kept to a minimum so that water and oxygen do not pass through it. To minimize the escape of water originally present in and necessary for proper functioning of the electrochromic mirror, the adhesive should itself be moisture resistant and hard over the temperature range at which the mirror is to operate. During processing, no volatiles should be evolved and the processing temperature should be low, preferably not above 60° C. Since hermetic adhesive 112 is at the periphery of the mirror and does not contact the electrochromic stack (thin films 100-106), higher temperatures up to 200° C. may be utilized at the periphery for short periods during processing, with the electrochromic stack itself being kept preferably below 60° C. Primary adhesive 112 may be polymeric, metallic, organic or organometallic and should have good adhesion to the glass substrate 82, coating 88, coating 92 and the hermetic backing 110. Suitable primary adhesives include silicones, epoxies, polyesters, acrylics, metal solders and ceramic cements. Currently epoxy adhesives are preferred.

In addition, a secondary adhesive 114 is preferably applied around the entire perimeter of substrate 82 and extending from the front of substrate 8 to the back side of hermetic backing 110 and covering the entire glue line formed by adhesive 112, thereby completing the isolation of the solid-state films 100-106 from the ambient environment. Secondary adhesive 114 is typically a low viscosity solution, emulsion or varnish that supplements the water barrier properties of adhesive 112 and also seals off any cracks or voids that may remain from the application of primary adhesive 112. Secondary adhesive 114 should have a good adhesion to substrate 82, primary adhesive 112, and hermetic backing 110. Suitable secondary adhesive materials include silicones, polyvinylidine chloride emulsions, polyesters, acrylics and cross-linking varnishes containing silanes and titanates. Currently preferred secondary adhesives are polyvinylidene chloride emulsions and the cross-linking varnishes.

Prior to the application of shatterproofing backing 108, and hermetic backing 110, the second wire lead or electrical connection 95 is applied to the rear surface of reflective coating 106 to complete the electrical circuit and allow application of an electric voltage or field across the stacked solid-state electrochromic layers. Such wire lead may be joined to the reflective coating by means of a conductive epoxy adhesive such as EPO-TEK TM H20E, available from Epoxy Technology Inc. of Billercia, Mass.

As will now be understood, reflective perimeter coatings 92, 92' should extend toward the center of glass element 82 sufficiently far to be aligned with or slightly overlap the edges of the stacked solid-state electrochromic layers 100-106. This will then effectively hide and conceal the edges of those layers, and the sealing area of shatterproofing backing 108, hermetic backing 110 and primary and secondary adhesives 112, 114 from view from the front side of the assembly 80.

Figure 8:
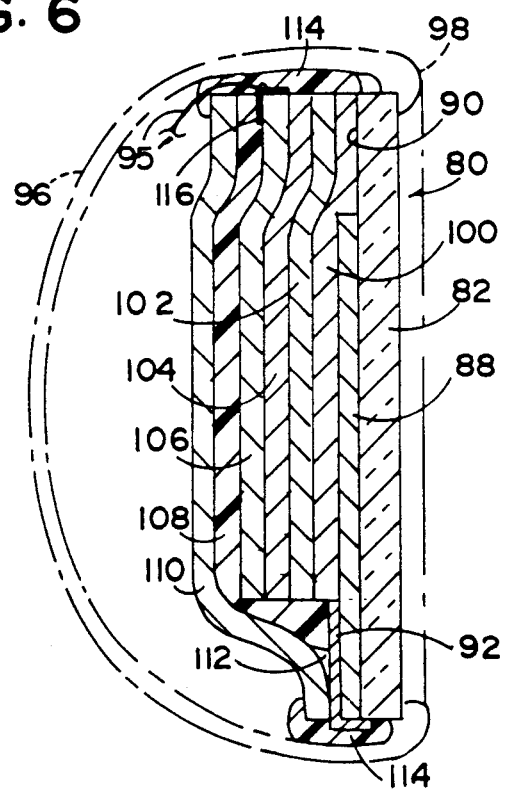
FIG. 8 is a sectional side elevation of a mirror of the present invention taken along plane VIII—VIII of FIG. 6.

Alternately, the electrical connections to assembly 80 can be made as shown in FIGS. 6 and 8. In this case, instead of the second electrical lead 95 being secured to the rear surface of reflective coating 106 as shown in FIG. 7, electrical lead 95' is soldered or adhered to a conductive layer 116 silk screened or otherwise applied to a small portion of the perimeter edge in area 90 not covered by the perimeter reflective metallic coating 92 (see FIGS. 5 and 6). Accordingly, the two electrical leads 94, 95' in this version will be connected immediately adjacent one another and, assuming appropriate electrical insulation, can be lead together to the rear of the mirror assembly for connection to an appropriate voltage source.

Figure 9:
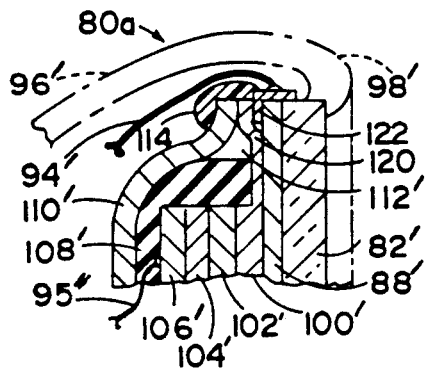
FIG. 9 is a fragmentary, sectional side elevation of a modified form of the mirror of FIGS. 5-8 including a solid-state, electro-optic cell.

Another alternative mirror assembly 80A using a single ITO coated element 82' having ITO layer 88 and a similar solid-state electrochromic stack of thin film layers 100-106 where like parts to those shown in FIGS. 5-8 are shown by like numbers is illustrated in FIG. 9. Assembly 80A of FIG. 9 differs in that instead of a metallic reflective perimeter coating for hiding and concealing the edge structure therebehind as in embodiment 80, embodiment 80A includes an opaque perimeter coating layer 120 which extends from the edge of the electrochromic solid-state thin film stack to the perimeter edge of the ITO coated substrate 82'. In addition, at the very edge of the ITO coated substrate, a thin layer 122 of electrically conductive material is silk screened or otherwise applied to provide an attachment point for wire lead 94'. Layer 122 extends around the corner of the substrate element and along the peripheral edge as shown in FIG. 9. In this assembly, the conductive layer 122, which is preferably formed from a conductive frit which is typically 2 millimeters wide and 25 microns thick is more expensive and need not be used as extensively as the opaque layer 120 which is less expensive. Suitable conductive coatings for layer 122 include silvery du Pont 7713, Emerson and Cumming Eccocoat CC-40A, or black conductive paint Emerson and Cumming Eccocoat 257 carbon based lacquer. Preferably, opaque layer 120 may be a black frit material which is silk screened in place and, thereafter, fired to cure and harden at the same time that conductive layer 122 is fired. A suitable frit material is Drakenfeld black enamel 24-1729 available from Drakenfeld Colors of Wilmington, Penn. The conductive layer 122 may be in any color such as silver since substantially all of it will lie behind the thin rim or bezel 98' of case 96'. However, for complete uniformity in color between layers 120 and 122, conductive frit layer 122 may also be black thereby providing a uniform, dark perimeter border visible through the front surface of assembly 80A. A suitable black conductive frit is SC 6002 (#6082) platinum/palladium ink from Englehard Corp. of Iselin, N.J. or Emerson and Cummings black conductive paint Eccocoat 257 carbon based lacquer.

Alternately, embodiments 80, 80A may also include opaque layers in place of metallic reflective coatings 92, 92' in order to conceal or hide the perimeter structure therebehind. In such case, the perimeter visible through the front surface of the assembly would appear dark and nonreflective at all times. To provide an electrical connection, the wire lead 94 could be passed through the opaque coating in such version and adhered to the ITO coating with conductive adhesive, a small area of silver frit or the like. Preferably, the opaque layers in such embodiments may be formed from a black frit material such as Drakenfeld black enamel 24-1729 referenced above.

Figures 11, 12:
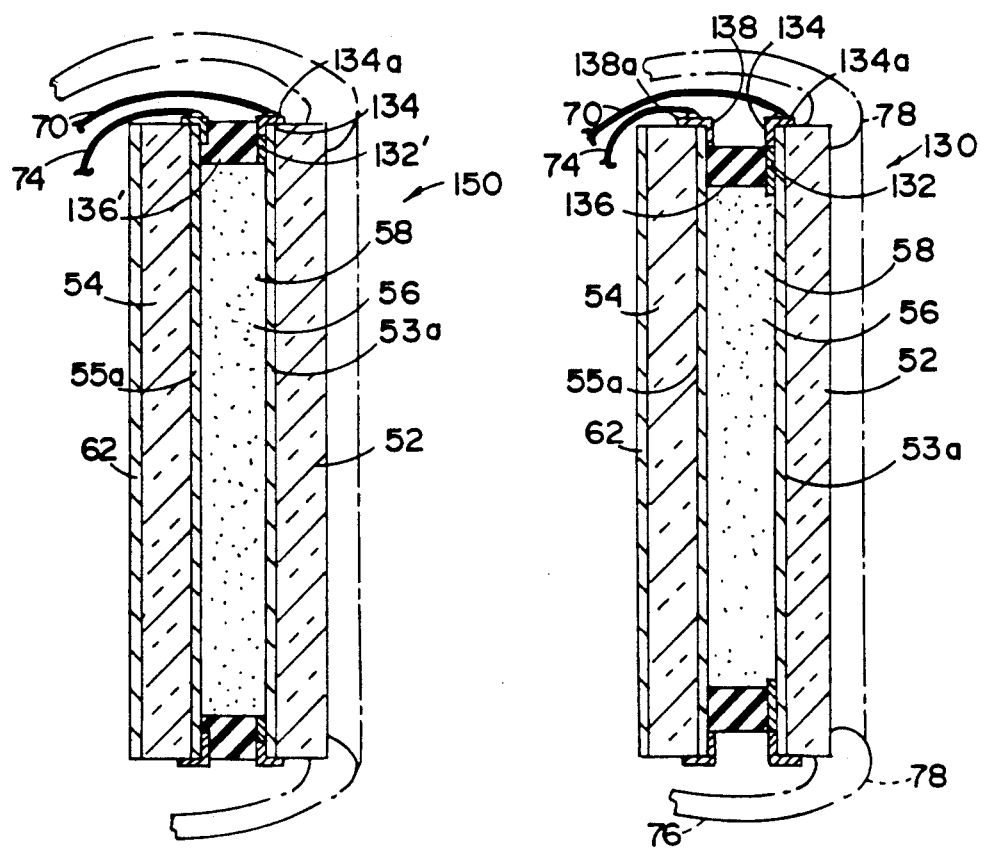
FIG. 11 is a sectional side elevation of a second modified form of the present invention incorporating a laminate electro-optic mirror assembly.
FIG. 12 is a sectional side elevation of a third modified form of the present invention incorporating a laminate electro-optic mirror assembly.

With reference to FIG. 11, an alternative form 130 of the laminate electro-optic mirror assembly 50 is illustrated, where like numbers indicate like parts. The front and rear glass substrates 52, 54, which are identical in size, are each coated with a layer of indium tin oxide on their rear and front facing surfaces respectively facing the gap 56 in which electro-optic medium 58 is confined. Instead of a metallic reflective coating at the perimeter of the assembly, however, a layer 132 of nonconducting black paint such as Drakenfeld black enamel 24-1729 is silk screened around the entire perimeter on the ITO coated, rear facing surface of front element 52 adjacent the peripheral edge but spaced inwardly from the peripheral edge of substrate 52 approximately 1 to 2 millimeters. Coating 132 preferably has a width of approximately 4 to 5 millimeters and is approximately 25 microns thick. A 1 to 2 millimeter by 25 micron thick layer 134 of conductive frit material, preferably du Pont 7713 if a silvery color is acceptable, or Englehard SC 6002 (#6082) platinum/palladium ink if black color is desired, is silk screened on the edge of layer 132 immediately adjacent the peripheral edge surface of the part such that it wraps around and extends along the peripheral edge surface at 134a and contacts ITO coating 53a as shown in FIG. 11. Layers 132, 134 are fired in a reducing atmosphere such that the black frit paint fuses and hardens as does the conductive frit material which is also highly conducting. The electro-optic medium 58 is confined by an approximate 150 micron thickness of epoxy sealant 136 loaded with glass beads spaced inwardly from the peripheral edges of the substrates 52, 54 approximately 2 millimeters. The ITO coated rear glass substrate 54 also includes a layer of conductive frit material such as du Pont 7713 or Emerson and Cumming Eccocoat 257 approximately 2 millimeters wide and wrapping around to the peripheral edge of the rear glass substrate at 138a. Wire leads 70, 74 are connected in the above described manner to conductive frit portions 134a, 138a as noted above. In this version, after the substrate elements 52, 54 are sealed together with sealant 136, only the black perimeter cosmetic coating 132 and frit coating 134 are visible through the front facing surface of substrate 52. If the frit coating 134 is silvery or is otherwise undesirably colored, it is substantially covered by bezel/rim 78. If the frit coating 134 is black or otherwise color matched to the case assembly, conceivably no bezel/rim 78 would be needed and so an essentially bezelless/rimless mirror would be enabled. The viewer is unaware of any of sealant 136, electrical connections 138, 138a or the second glass element. Black perimeter layer 132 extends inwardly of the epoxy/glass bead sealant/spacing material so as to completely cover and hide that sealant material.

As shown in FIG. 12, another version 150 of the laminate electro-optic mirror assembly incorporating the perimeter coating of the present invention is also illustrated. Embodiment 150, where like numerals indicate like parts, is substantially similar to embodiment 130 except that the sealant/spacing epox material 136' which is loaded with glass beads is applied closer to the peripheral edges of the glass substrate elements and nonconductive black frit layer 132' is narrower than black frit layer 132 in embodiment 130. Layer 132' is substantially coterminous with the inside surface of sealant 136'. Otherwise embodiment 150 is similar to embodiment 130 such that when viewed from the front, only a narrower black perimeter coating would be visible while the sealant and electrical connections would be concealed from view from the front.

Figure 13:
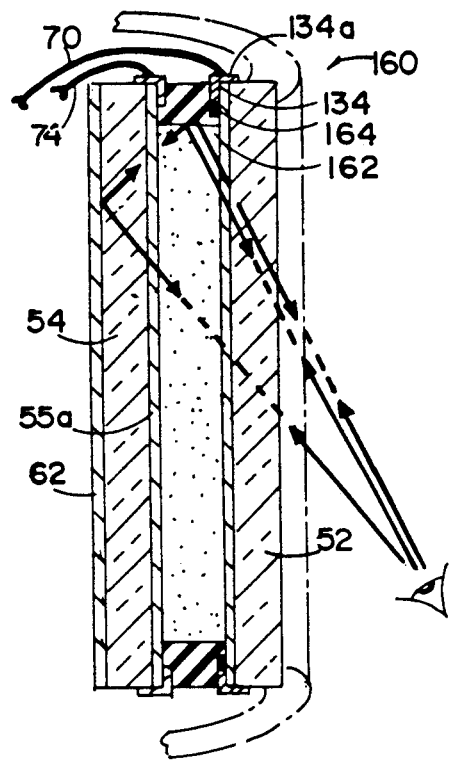
FIG. 13 is a sectional side elevation of a fourth modified form of the present invention incorporating a laminate electro-optic mirror assembly.

As shown in FIG. 13, yet another embodiment 160 of the laminate electro-optic mirror assembly is illustrated wherein like parts to those in assembly 50, 130 and 150 are indicated by like numerals. In this version, carbon black or another nonconducting coloring agent is added to the epoxy sealant/spacing material to provide a dark colored seal/spacer 162. A suitable nonconductive, black epoxy is Stan-Tone ™ 90EPX01 or 90EPX04 from Hartwick Chemical Corporation of Akron, Ohio. As in embodiment 150, a nonconductive, black frit layer 164 such as Drakenfeld black enamel 24-1729 is applied over the rear surface of the ITO coated front glass substrate 52 with a conductive frit 134, 134a applied to the outer perimeter and peripheral edge of the front glass substrate element 52. Black frit layer 164 is used to reduce the amount of conductive frit which is necessary in order to reduce expense. However, less black frit material is included in layer 164 than in layers 132 or 132' since it is a narrower band or peripheral strip and epoxy sealant/spacer 162 extends from the rear ITO coating 55a to the front ITO coating 53a. However, since sealant/spacer 162 is substantially similar in color to the black frit material, only a narrow black border or band is visible from the front surface of the assembly as in embodiments 130 and 150. An additional advantage is provided, however, when the assembly is viewed from an oblique angle at the front as indicated in FIG. 13. Since much conventional epoxy material is light colored, coloring the epoxy 162 with carbon black or another dark colorant prevents the sealant for gap 56 from being highly noticeable when the assembly is viewed at such an oblique angle. Note that the epoxy seal/spacer can be viewed directly, obliquely, and by oblique reflection in the silver reflector 62 on the rear surface of the second element 54 as shown in FIG. 13. The entire width of the epoxy sealant 162 is approximately 5 millimeters and glass beads for spacing are included as in seals 136, 136'.

Figure 14:
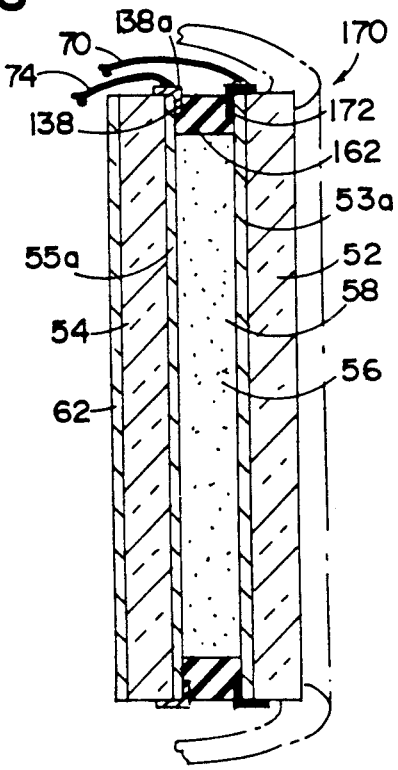
FIG. 14 is a sectional side elevation of a fifth modified form of the present invention incorporating a laminate electro-optic mirror assembly.

As shown in FIG. 14, yet another version 170 of the laminate electro-optic mirror assembly is shown similar to embodiment 160 where like numerals indicate like parts to those in embodiments 50, 130, 150 and 160. However, instead of the combined black frit/conductive frit coating on the rear facing surface of the ITO coated front glass substrate, a single coating of conductive black frit or paint 172 such as Englehard SC 6002 (#6082) platinum/palladium ink or Emerson and Cumming Eccocoat 257 is provided on the perimeter portion of the ITO coating 53a such that it wraps around the edge corner of the front glass substrate onto the peripheral edge surface as shown in FIG. 14. Electrical connections from wire leads 70, 74 are made directly to the conductive black frit 172 and to the conductive frit 138, 138a as in embodiments 130, 150 and 160. Again, since seal 162 includes carbon black or another dark colorant in the epoxy/glass bead mixture, and the seal width extends beyond the inner edge of coating 172, the perimeter area appears as a dark band around the entire assembly when viewed from the front and is also less obtrusive when viewed at an oblique angle as in embodiment 160.

Figure 15:
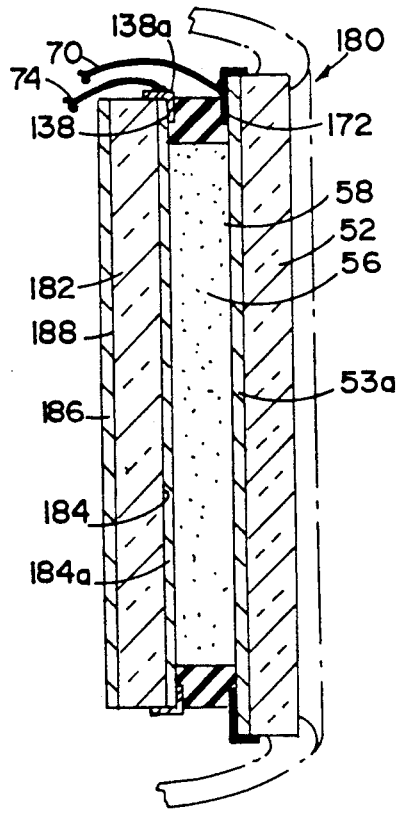
FIG. 15 is a sectional side elevation of a sixth modified form of the present invention incorporating a laminate electro-optic mirror assembly.

FIG. 15 illustrates yet another embodiment 180 of the laminate electro-optic mirror assembly where like parts to those in previous embodiments are indicated by like numerals and which is similar to embodiment 170 except that rear element 182 is of a size smaller than front element 52. Rear element 182 includes ITO coating 184a on its front facing surface 184 and a metallic reflective coating 186 like that in embodiment 50 on its rear facing surface 188. In addition, seal 190 is provided between the front and rear substrate elements 52, 182 which is similar to seal 162 and includes carbon black or other dark colorant and glass spacing beads but is narrower in width such that it extends only to the periphery of the smaller rear glass substrate element 182 and only partway outwardly along the width of conductive black frit layer 172. Embodiment 180 provides a convenient attachment and concealment of the electrical connections for electrical leads 70, 74 such that the connection for lead 74 is behind conductive black frit layer 172 while lead 70 may be connected to the rear surface of conductive black frit layer 172 adjacent seal 190 or on the peripheral edge portion of frit layer 172 as desired. Thus, this embodiment is particularly suited to bezelless mirror constructions. Since the seal 190 is dark in color, it is less noticeable when viewed at an oblique angle from the front of the assembly. Overall, only a narrow black or dark border around the entire periphery of the assembly appears when the assembly is viewed from the front.

Figure 17:
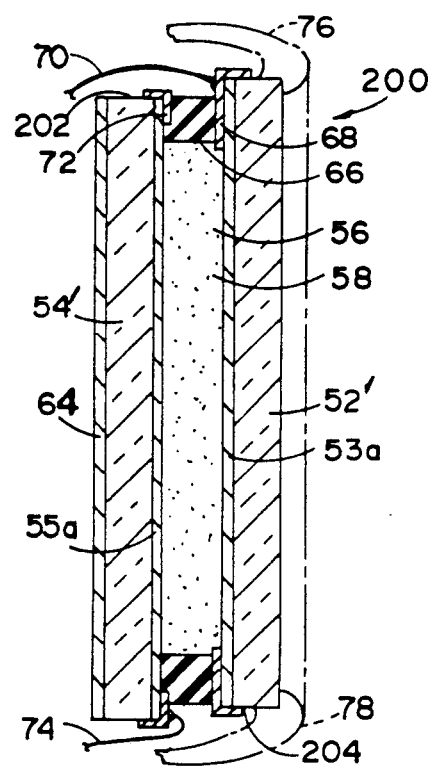
FIG. 17 is a sectional side elevation of the mirror assembly taken along plane XVII—XVII of FIG. 16.
Figure 16:
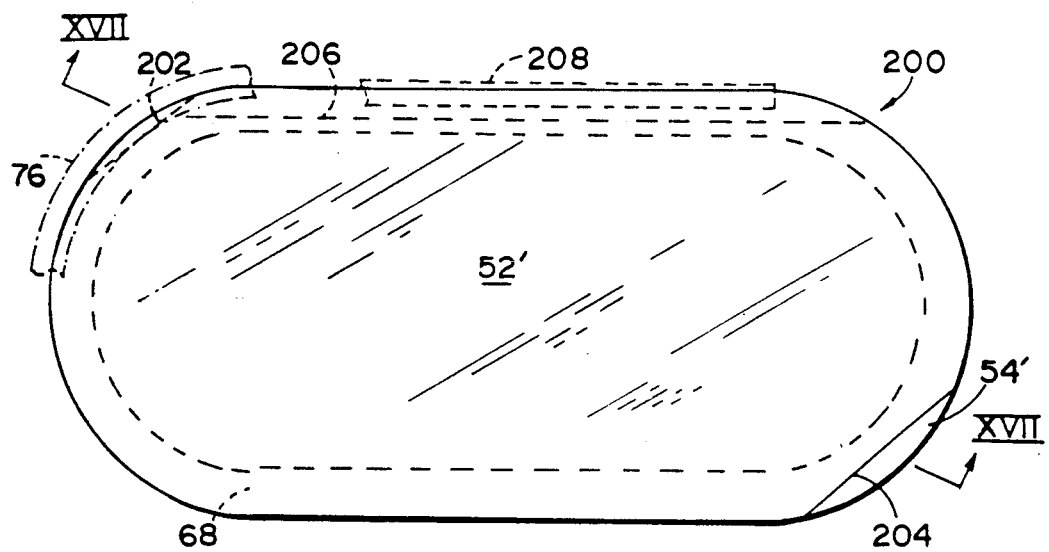
FIG. 16 is a front elevation with portions broken away of a seventh modified form of the present invention incorporating a laminate electro-optic mirror assembly.

An additional embodiment 200 of the electro-optic laminate mirror assembly is shown in FIGS. 16 and 17. Embodiment 200 is similar to embodiment 50 where like numerals indicate like parts except for the inclusion of spaced notches or relieved portions in the glass substrate elements 52, 54. In this case, rear substrate element 54' is notched at 202 at one end thereof across the entire thickness of the substrate such that direct access to the rear facing surface of the ITO/perimeter coated front substrate element 52' is available. Likewise, front substrate element 52' is notched at 204 at a position spaced from notch 202 to provide access to the front facing surface of the ITO/conductive frit coated rear glass substrate element 54'. These notches provide convenient connection points for wire leads 70, 74, metal clips, ribbon connectors, solder, or the like by allowing such connections within the overall dimensions of the assembly. For example, one or both of the substrate elements such as rear substrate element 54' can be notched along one or more of its entire edges such as along its top edge at 206 in FIG. 16. A metal ribbon connector 208 with U-shaped cross section can then be clipped over the exposed ITO coated, rear facing portion of front substrate element 52' such that the connector 208 contacts the ITO coating. Electrical leads can then be joined to the ribbon connector. These connections can be made to the rear surface of metallic reflective coating 68 and to the front surface of conductive layer 72 without necessitating connections on the peripheral edge of the assembly. Moreover, such connections will be hidden by the metallic reflective coating 68 and/or the mirror case 76 and rim structure/bezel 78 as is evident from FIG. 17. In embodiment 200, wire leads 70, 74 are preferably soldered or otherwise adhered to coating 68 or layer 72.

Figure 18:
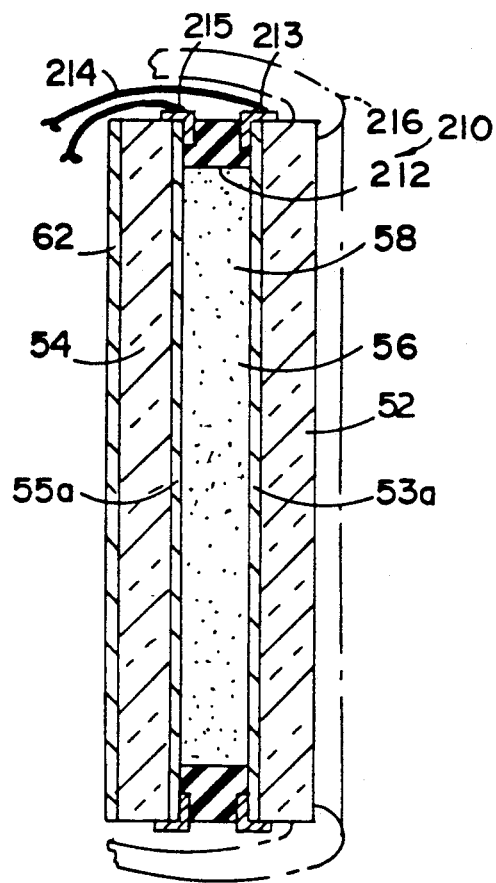
FIG. 18 is a sectional side elevation of an eighth modified form of the present invention incorporating a laminate electro-optic assembly.

As shown in FIG. 18, another version 210 of the electro-optic laminate mirror assembly is shown where like numerals indicate like parts to those in previous embodiments. Assembly 210 includes a dark colored, epoxy sealant/spacing material 212 between the ITO coated front and rear elements 52, 54 and, as in embodiment 160, is preferably formed from conventional epoxy sealing material to which is added Stan-Tone ™ 90EPX01 or 90EPX04 from Hartwick Chemical Corporation. Such sealant, which may include glass spacing beads as mentioned above, provides a narrow black border or band visible from the front surface of the assembly as in the prior embodiments. Electrical connections 213, 215 to the ITO coatings 53a, 55a are provided at the outer perimeter portions of the ITO coatings immediately adjacent the peripheral edges of the front and rear elements overtop the ITO coatings and may be formed from a silvery conductive frit such as Emerson and Cumming Eccocoat CC-40A or du Pont 7713, or black conductive frit such as Englehard SC 6002 (#6082) platinum/palladium ink if a black coating is desired. In either event, the peripheral rim or bezel of the surrounding case conceals these conductive frit layers leaving only the black sealant to be visible.

It is also possible for sealant 212 to be color matched to the color of surrounding mirror case 214, and especially to rim or bezel 216. Case 214 is typically molded from a resinous plastic material of a desired color. Thus, sealant 212 could be formed in a color other than black such as brown, green, red, blue or the like. Epoxy paste dispersions of a type including selected pigments in an epichlorohydrin/bisphenol A-type, low molecular weight epoxy resin are available from Hartwick Chemical Corporation, Akron, Ohio under the trademark Stan-Tone EPX with various pigment types providing these and other colors. Hence, when viewed from the direction of front element 52, only the thin rim or bezel which conceals any conductive layers 213, 215 is visible in a coordinated color which is matched to that of sealant 212. The combined rim 216 and sealant 212 appear as a single, narrow band at the periphery of the assembly.

Figure 19:
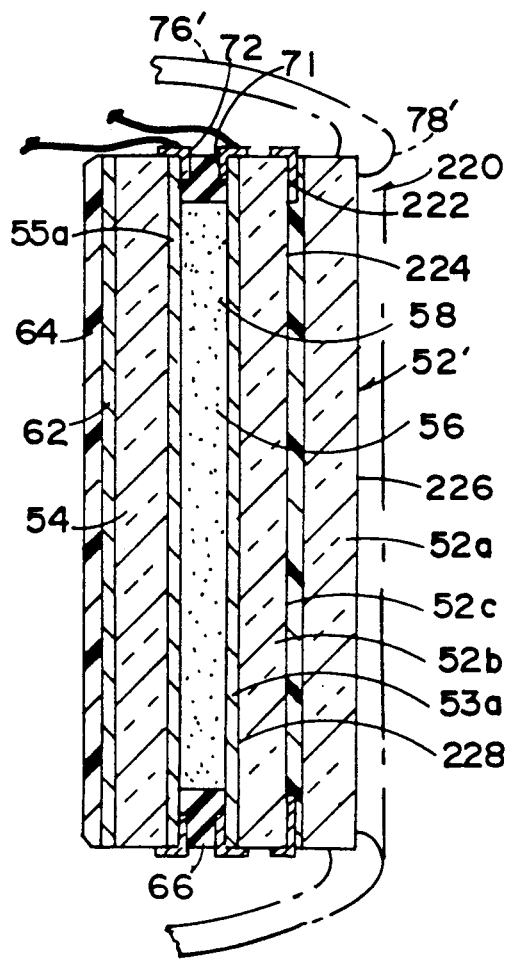
FIG. 19 is a sectional side elevation of a ninth modified form of the present invention incorporating a laminate electro-optic assembly.

A further version 220 of the laminate electro-optic mirror assembly is shown in FIG. 19 where like numerals indicate like parts to those in previous embodiments. Electro-optic rearview mirror assembly 220 has front element 52 replaced with a laminate panel assembly 52' comprised of front element 52a having parallel front and rear surfaces adhered by an intermediate layer/interlayer 52c, of SAFLEX TM #SR11 polyvinyl butyral (PVB) from Monsanto Plastics and Resins Co., St. Louis, Mo. to an intermediate element 52b also having parallel surfaces. Preferably, elements 52a, 52b are formed from glass in which case interlayer 52c is adhered to the rear facing surface of glass element 52a and the front facing surface of glass element 52b by heat and pressure lamination such as with the conventionally known autoclave method or the like. Elements 52a, 52b may be conventional soda lime window glass or other specialized glass as set forth in U.S. patent application Ser. No. 07/155,256 referenced above. The rear facing surface of intermediate element 52b is coated with a transparent, electrically conductive coating such as indium tin oxide (ITO) in a layer 53a which is, in turn, sealed with the front ITO coated surface of rear element 54 by seal 66 to provide a space 56 incorporating an electro-optic medium as described above. Electrical energy is applied to ITO coatings 53a, 55a by means of electrically conductive material layers 71, 72 respectively, which layers are applied over or beneath ITO coatings 53a, 55a adjacent substantially the entire peripheral edge surface of elements 52b, 54 such that they extend around and onto the peripheral edges of the elements as described above. Like coating 72 described above, coating 71 is preferably a silvery conductive paint or frit such as du Pont 7713 or Eccocoat CC-40A. Sealant 66 is applied over the conductive layers 71, 72 in contact with those layers as well as the ITO coatings at positions spaced inwardly of coatings 71, 72 as shown in FIG. 19. As in embodiment 50, wire leads are soldered or otherwise adhered to the peripheral edge portions of coatings 71, 72 to allow application of electrical energy to the ITO coatings.

Instead of positioning a perimeter coating on the exposed front surface or the rear surface adjacent the ITO coating in embodiment 220, however, a reflective or opaque perimeter coating 222 is preferably applied to the front facing surface 224 of intermediate element 52b such that the coating extends inwardly toward the center of the element a sufficient distance to cover sealant 66 and electrically conductive layers 71, 72. Coating 222 also extends around the corner of element 52b onto the peripheral edge as shown in FIG. 19, and is in contact with PVB layer 52c when the elements 52a, 52b are laminated together by that interlayer. Alternately, perimeter coating 222 could be applied to the front facing surface 226 of element 52a or to the rear facing surface 228 of element 52b in which form layer 71 could be eliminated if coating 222 was electrically conductive. In any case, perimeter coating 222 provides either a reflective or opaque coating which conceals sealant 66 and conductive layers 71, 72 from sight when the assembly is viewed from the direction of front surface 226. As in previous embodiments, perimeter coating 222 can be formed as a specular reflective surface from a metallic reflective coating such as aluminum, silver/copper or another material, as a nonconductive frit or paint such as Drakenfeld black enamel 24-1729 or another color, or as a conductive frit or paint such as Englehard SC 6002 (#6082) platinum/palladium ink or Eccocoat 257. Indeed, as in embodiment 210, perimeter coating 222 could also be matched in color to the color of case 76' and especially rim or bezel 78'.

It will now be apparent that in each of the described embodiments which use a specularly reflective and conducting coating, the perimeter coating provides a reflective area which increases the field of view while concealing the electro-optic seal structure and any electrical connections therebehind while providing an effective electrical connection which enhances coloration response of the electro-optic cell. Alternately, the opaque perimeter coating or color matched sealant conceals the electrochromic structure or blends with the surrounding case while providing an unobtrusive narrow band which allows the assembly to be matched to nonelectro-optic mirror assemblies which may be in use on the same vehicle. In many embodiments, it is practically and aesthetically feasible to dispense with a bezel/edge rim leading to an essentially bezelless mirror element.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. An electro-optic mirror assembly comprising:
   at least first and second spaced, optically transparent elements, said elements each having a peripheral edge and front and rear facing surfaces and defining a space therebetween;

an electro-optic medium confined in said space the transmittance of said medium being variable upon the application of an electric field thereto;

seal means extending around the entire periphery of said assembly and extending between said first and second elements adjacent said peripheral edges for spacing said elements apart and confining said electro-optic medium in said space;

electrical means for applying an electric field to said electro-optic medium to cause variation in the light transmittance of said medium;

a reflective coating on one of said front and rear facing surfaces of said second element adapted to reflect light incident thereon through said first element and said electro-optic medium; and a perimeter coating on at least one of a portion of said electrical means and one of said front and rear facing surfaces of said first element adjacent said peripheral edge of said first element for concealing said seal means and portions of said electrical means therebehind when said assembly is viewed from said first element toward said second element.

2. The assembly of claim 1 wherein said perimeter coating is reflective and appears substantially similar to said reflective coating when viewed from said front surface of said first element.

3. The assembly of claim 2 wherein said perimeter coating is metallic and is selected from the group including silver, aluminum, chromium, stainless steel, rhodium, platinum, palladium and combinations thereof.

4. The assembly of claim 2 wherein said perimeter coating is electrically conductive, extends around substantially said entire first element adjacent said peripheral edge, and contacts at least a portion of said electrical means on said first element.

5. The assembly of claim 4 wherein said perimeter coating is opaque to light incident on said assembly from said front surface of said first element.

6. The assembly of claim 5 wherein said perimeter coating is formed from a black frit, paint or lacquer.

7. The assembly of claim 4 wherein said electrical means include a transparent, electrically conductive layer on said rear facing surface of said first element; said reflective perimeter coating being applied to said conductive layer on said first element.

8. The assembly of claim 7 wherein said electrical means further include a transparent, electrically conductive layer on said front facing surface of said second element and a layer of electrically conducting material adjacent said peripheral edge of said second element and contacting said electrically conductive layer on said second element; a first electrical lead connected to said reflective perimeter coating on said first element; and a second electrical lead connected to said conducting material layer on said second element.

9. The assembly of claim 8 wherein said reflective perimeter coating and said electrically conducting material layer each extend around substantially the entire periphery of said conductive coating layers on said first and second elements and wrap around to and extend at least partially across the peripheral edges of said respective first and second elements.

10. The assembly of claim 1 wherein said perimeter coating is opaque to light incident on said assembly from said front surface of said first element.

11. The assembly of claim 10 wherein said perimeter coating is formed from a black frit, paint or lacquer.

12. The assembly of claim 1 wherein said perimeter coating is electrically conductive, extends around substantially said entire first element adjacent said peripheral edge, and contacts at least a portion of said electrical means on said first element.

13. The assembly of claim 12 wherein said electrical means include a transparent, electrically conductive layer on said rear facing surface of said first element; said perimeter coating being applied to said conductive layer on said first element.

14. The assembly of claim 12 wherein said electrical means include a transparent, electrically conductive layer on said rear facing surface of said first element; said perimeter coating being applied to said rear facing surface of said first element with said transparent, electrically conductive layer extending thereover.

15. The assembly of claim 1 wherein said seal means has a dark color such that it is less conspicuous when said assembly is viewed from said front facing surface of said first element at an oblique angle.

16. The assembly of claim 15 wherein said seal means is a layer of epoxy material positioned behind said perimeter coating, said epoxy material including carbon black to impart a black color to said epoxy material.

17. The assembly of claim 1 wherein said seal means include a layer of epoxy material incorporating a plurality of small glass beads mixed therein, said epoxy layer positioned behind said perimeter coating.

18. The assembly of claim 1 wherein said second element is smaller than said first element, said peripheral edge of said second element positioned behind said perimeter coating.

19. The assembly of claim 1 wherein said assembly includes notches at a pair of spaced positions along said peripheral edges of said elements, a first of said notches including one portion of said peripheral edge of said first element being removed to expose a portion of said front facing surface of said second element and a portion of said electrical means on said second element for connection of an electrical lead thereto; the second of said notches including one portion of said peripheral edge of said second element being removed to expose a portion of said rear facing surface of said first element and a portion of said electrical means on said first element for connection of an electrical means thereto.

20. The assembly of claim 1 wherein said perimeter coating is on a front facing surface of said first element.

21. The assembly of claim 20 wherein said perimeter coating is reflective and appears substantially similar to said reflective coating when viewed from said front facing surface of said first element.

22. The assembly of claim 20 wherein said perimeter coating is opaque to light incident on said assembly from said front facing surface of said first element.

23. The assembly of claim 1 wherein a first portion of said perimeter coating is electrically conductive and contacts at least a portion of said electrical means on said first element, a second portion of said perimeter coating not being electrically conductive but is opaque to light incident on said assembly from said front surface of said first element, said first and second perimeter coating portions extending around and adjacent substantially the entire peripheral edge of said first element.

24. The assembly of claim 23 including an electrical lead connected to said first portion of said perimeter coating.

25. The assembly of claim 1 wherein said electrical means include a transparent, electrically conductive layer on said front facing surface of said second element and a layer of electrically conducting material adjacent said peripheral edge on one of said front facing surface of said second element and said transparent, electrically conductive layer, said electrically conducting material layer contacting said electrically conductive layer on said second element; a first electrical lead connected to said reflective perimeter coating on said first element; and a second electrical lead connected to said conducting material layer on said second element.

26. The assembly of claim 1 wherein said electrical means includes said reflective coating on said front facing surface of said second element in contact with said electro-optic medium, said reflective coating being conductive.

27. The assembly of claim 1 wherein said first element is a laminate assembly having a pair of optically transparent panels adhered to one another by an optically transparent, intermediate layer.

28. The assembly of claim 27 wherein said perimeter coating is on one of said front and rear facing surfaces of one of said panels and is in contact with said intermediate layer.

29. The assembly of claim 28 wherein said perimeter coating is on said front facing surface of the rearwardmost panel of said laminate first element assembly.

30. An electro-optic mirror comprising:
an optically transparent element having front and rear surfaces and a peripheral edge;
an electro-optic medium on the rear surface of said element, said medium having an optically variable transmittance upon the application of an electric field thereto;
electrical means for applying an electric field to said electro-optic medium to cause variation in the light transmittance of said medium;
a reflective coating on said electro-optic medium adapted to reflect light incident thereon through said element and said electro-optic medium;
a perimeter coating on at least one of said electrical means or a surface of said element and adjacent the periphery of said element for concealing perimeter portions of said assembly including portions of said electrical means therebehind when said assembly is viewed from said front surface of said element.

31. The mirror of claim 30 wherein said perimeter coating is on said front surface of said element.

32. The mirror of claim 31 wherein said perimeter coating is reflective and appears substantially similar to said reflective coating when viewed from said front surface of said first element.

33. The mirror of claim 31 wherein said perimeter coating is opaque to light incident on said assembly from said front surface of said element.

34. The mirror of claim 33 wherein said perimeter coating is formed from a black frit, paint or lacquer.

35. The mirror of claim 30 wherein said electrical means includes a transparent, electrically conductive layer on said rear surface of said element, said perimeter coating being in contact with said electrically conductive layer at the rear of said element.

36. The mirror of claim 35 wherein said perimeter coating is electrically conductive and extends around substantially said entire element adjacent said perimeter edge on said electrically conductive layer.

37. The mirror of claim 36 wherein said perimeter coating is reflective and appears substantially similar to said reflective coating when viewed from said front surface of said first element.

38. The mirror of claim 36 wherein said perimeter coating is formed from a conductive black frit, paint or lacquer.

39. The mirror of claim 35 wherein a first portion of said perimeter coating is electrically conductive and contacts at least a portion of said electrical means on said element, a second portion of said perimeter coating not being electrically conductive but is opaque to light incident on said assembly from said front surface of said element, said first and second perimeter coating portions extending around substantially said entire element adjacent said peripheral edge.

40. The mirror of claim 35 wherein said electro-optic medium includes:
a first electrochromic material in abutting relationship with said electrically conductive layer, said first electrochromic material being one of an anodic electrochromic layer and a cathodic electrochromic layer;
a solid electrolyte layer in abutting relationship to said first electrochromic material;
a second electrochromic material in abutting relationship with said electrolyte layer, said second electrochromic material being the other of said anodic electrochromic layer and cathodic electrochromic layer;
said reflective coating being a layer of reflective and conductive material in abutting relationship with said second electrochromic material.

41. The mirror of claim 40 including a coating suitable to protect said electro-optic mirror from environmental and mechanical damage, said coating comprising a shatterproofing coating in contact with and adhered to said element and substantially covering the exposed surfaces of said electro-optic medium and a hermetically sealing coating covering the entire exposed surface of said shatterproofing coating and being in contact with and adhered to said element.

42. The mirror of claim 41 wherein said hermetically sealing coating is adhesively joined to said element by a hermetic primary adhesive.

43. The mirror of claim 42 including a bead of secondary adhesive around the outer periphery of said mirror, said secondary adhesive extending from adjacent said front surface of said element to the backside of said hermetically sealing coating across the entire hermetic coating-element adhesive line.

44. An electro-optic mirror assembly comprising:
at least first and second spaced, optically transparent elements, said elements each having a peripheral edge and front and rear facing surfaces and defining a space therebetween;
an electro-optic medium confined in said space, the transmittance of said medium being variable upon the application of an electric field thereto;
electrical means for applying an electric field to said electro-optic medium to cause variation in the light transmittance of said medium;
a reflective coating on one of said front and rear facing surfaces of said second element adapted to reflect light incident thereon through said first element and said electro-optic medium; and
seal means adjacent and extending around the entire periphery of and extending between said first and second elements adjacent said peripheral edges for spacing said elements apart and confining said electro-optic medium in said space, said seal means being dark in color such that it provides a dark perimeter border around said assembly when viewed from said front facing surface of said first element.

45. The assembly of claim 44 wherein said mirror assembly includes a mirror case including a bezel/retaining rim extending over the perimeter portion of said front facing surface of said first element: said assembly also including a conductive perimeter means on at least one of a portion of said electrical means and said rear facing surface of said first element adjacent said peripheral edge of said first element for contacting and applying electrical energy to a portion of said electrical means which applies electrical energy to said electro-optic medium; said conductive perimeter means being sufficiently narrow to be concealed behind said bezel/retaining rim when said assembly is viewed from said front facing surface of said first element.

46. The assembly of claim 45 wherein said conductive perimeter means is selected from the group including a conductive frit, solder, a clip and a ribbon connector.

47. The assembly of claim 45 wherein said conductive perimeter means is a ribbon connector which extends along an edge of one of said first and second elements adjacent said peripheral edge thereof.

48. The assembly of claim 44 wherein said mirror assembly includes a mirror case including a bezel/retaining rim extending over the perimeter portion of said front facing surface of said first element; said bezel/retaining rim having a dark color matched to said dark color of said seal means.

49. The assembly of claim 44 wherein said seal means is an epoxy material incorporating carbon black to impart a black color to said epoxy material.

50. An electro-optic mirror assembly comprising:
at least first and second spaced, optically transparent elements, said elements each having a peripheral edge and front and rear facing surfaces and defining a space therebetween;
an electro-optic medium confined in said space, the transmittance of said medium being variable upon the application of an electric field thereto;
electrical means for applying an electric field to said electro-optic medium to cause variation in the light transmittance of said medium;
a reflective coating on one of said front and rear facing surfaces of said second element adapted to reflect light incident thereon through said first element and said electro-optic medium; and
seal means adjacent and extending around the entire periphery of and extending between said first and second elements adjacent said peripheral edges for spacing said elements apart and confining said electro-optic medium in said space;
said mirror assembly includes a mirror case including a bezel/retaining rim extending over the perimeter portion of said front facing surface of said first element;
said seal means having a color matched and corresponding to said bezel/retaining rim such that said bezel/retaining rim and seal means appear as a perimeter border of uniform color around said assembly when viewed from said front facing surface of said first element.

51. The assembly of claim 50 wherein said assembly also includes a conductive perimeter means on at least one of a portion of said electrical means and said rear facing surface of said first element adjacent said peripheral edge of said first element for contacting and applying electrical energy to a portion of said electrical means which applies electrical energy to said electro-optic medium; said conductive perimeter means being sufficiently narrow to be concealed behind said bezel/retaining rim when said assembly is viewed from said front facing surface of said first element.

52. The assembly of claim 51 wherein said conductive perimeter means is selected from the group including a conductive frit, solder, a clip and a ribbon connector.

53. The assembly of claim 51 wherein said conductive perimeter means is a ribbon connector which extends along an edge of one of said first and second elements adjacent said peripheral edge thereof.

54. The assembly of claim 50 wherein said seal means is an epoxy material incorporating carbon black to impart a black color to said epoxy material.

* * * * *

UNITED STATES PATENT AND TRADEMARK OFFICE
CERTIFICATE OF CORRECTION

PATENT NO. : 5,066,112
DATED : November 19, 1991
INVENTOR(S) : Niall R. Lynam et al.

It is certified that error appears in the above-identified patent and that said Letters Patent is hereby corrected as shown below:

In the Abstract, line 6:

"elctro-optic" should be --electro-optic--

In the Abstract, line 7:

"meidum" should be --medium--

Column 7, line 12:

"abandone" should be --abandoned--

Column 9, line 60:

After "butylaniline" insert --,--

Column 14, line 30:

"substrate 8" should be --substrate 82--

Signed and Sealed this

Eleventh Day of May, 1993

Attest:

MICHAEL K. KIRK

*Attesting Officer*     *Acting Commissioner of Patents and Trademarks*